E. LYON.
GATE.

No. 176,021. Patented April 11, 1876.

WITNESSES:
E. Wolff
John Goethals

INVENTOR:
E. Lyon
BY
ATTORNEYS.

UNITED STATES PATENT OFFICE.

EMERSON LYON, OF STOUGHTON, WISCONSIN.

IMPROVEMENT IN GATES.

Specification forming part of Letters Patent No. 176,021, dated April 11, 1876; application filed February 28, 1876.

*To all whom it may concern:*

Figure 1:
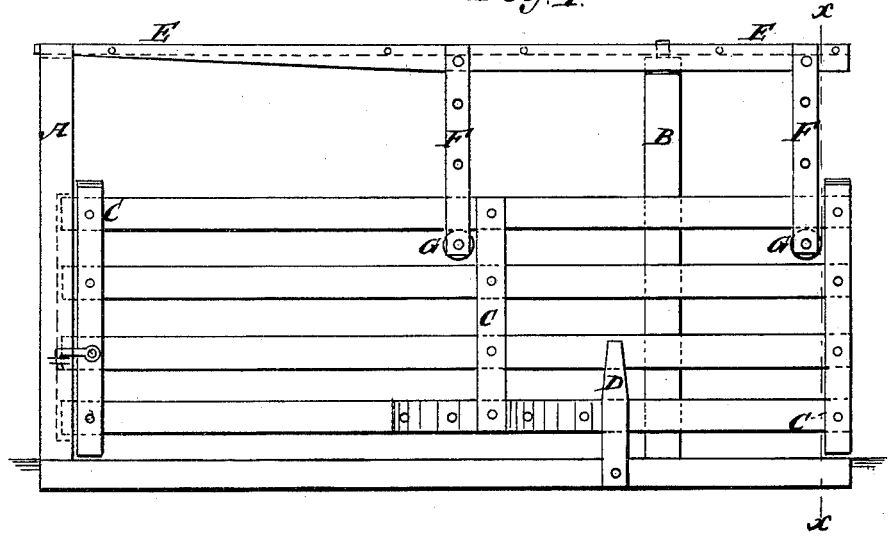
Figure 2:
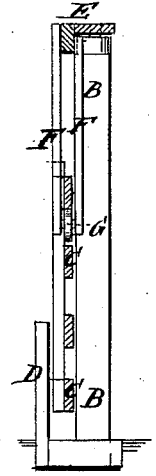
Figure 3:
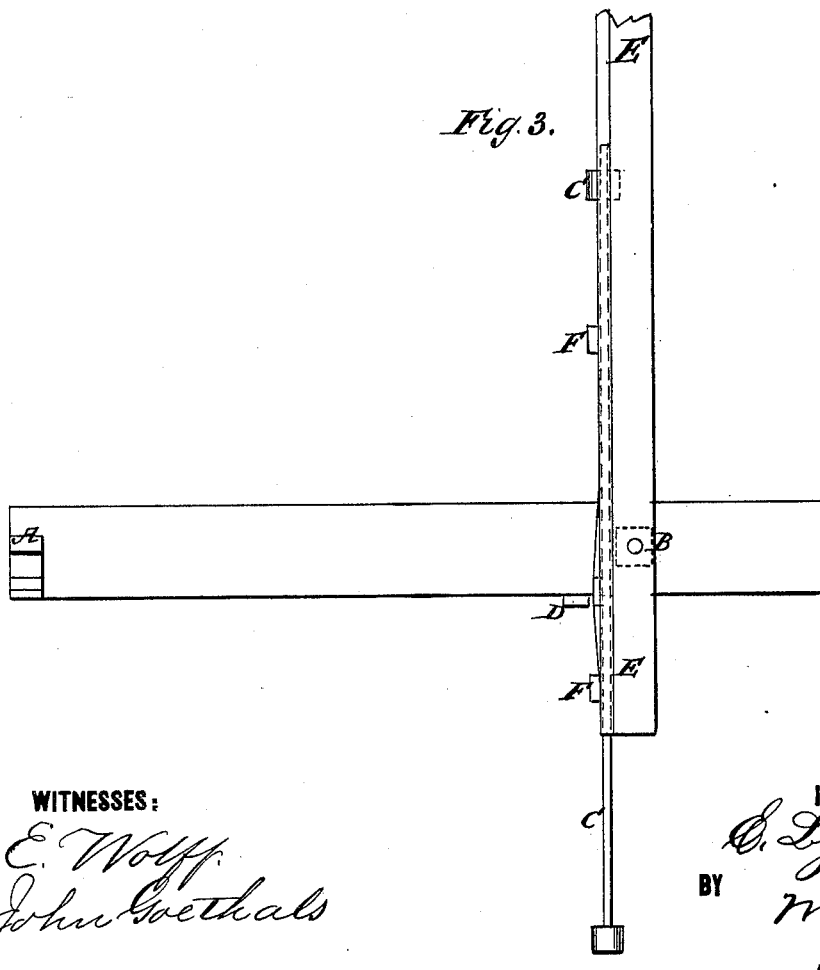

Be it known that I, EMERSON LYON, of Stoughton, in the county of Dane and State of Wisconsin, have invented a new and useful Improvement in Gates, of which the following is a specification:

Figure 1 is a side view of my improved gate closed. Fig. 2 is a vertical cross-section of the same, taken through the line $x\,x$, Fig. 1. Fig. 3 is a top view of the same, the gate being shown as swung open.

Similar letters of reference indicate corresponding parts.

The object of this invention is to furnish an improved gate which shall be simple in construction and convenient in use, and may be readily adjusted to work at less or greater distance from the ground, as may be necessary.

The invention consists in the pivoted horizontal bar, provided with the hangers and the adjustable rollers, in combination with the gate and the posts, as hereinafter fully described.

A is the front, and B is the rear, post. C is the gate, the forward ends of the horizontal bars of which project a little, so as to enter mortises in the front post A, to keep the forward end of the gate, when closed, from lateral movement.

The rear part of the gate C passes along the side of, and projects beyond the rear post B, and is held up against said post by a small guide-post or stake, D, set at such a distance from the post B as to keep the gate C against the said post B when closed, when pushed back, and when swung around, as shown in Figs. 1, 2, and 3. To the upper end of the rear post B is pivoted a horizontal bar, E, which is made of such a length that its forward end may rest in a notch in the top of the forward post A, and that its rear end may project about as far as the rear end of the gate C, when the said gate is closed. To the bar E, upon the opposite sides of the post B, are attached two pairs of arms or hangers, F, the arms of each pair being at such a distance apart as to receive the upper horizontal bars of the gate C between them.

G are two rollers placed in the slots of the hangers F, below the top horizontal bar of the gate C, and pivoted to said hangers. Several holes are formed in the hangers F, to receive the pivoting pins or bolts of the rollers G, so that the gate may be raised to adjust it to work above snow or other obstruction when necessary.

In using the gate it is opened for the passage of men and stock by sliding it back upon the rollers G. For the passage of wide or high loads the gate C is pushed back, so that it and the bar E are balanced upon the post B, and the gate C and bar E are then swung around upon the pivot of the post B into a position parallel with the roadway, as shown in Fig. 3. When the gate is to be left open it is drawn forward until out of balance, and its forward end is then dropped to the ground.

Having thus described my invention, I claim as new and desire to secure by Letters Patent—

The pivoted horizontal bar E, provided with the hangers F and the adjustable rollers G, in combination with the gate C and posts A B, substantially as herein shown and described.

EMERSON LYON.

Witnesses:
LOUIS ALLEN,
T. P. CAMP.